United States Patent [19]

Shimoni et al.

[11] Patent Number: 4,777,620
[45] Date of Patent: Oct. 11, 1988

[54] DATA COMPRESSION SYSTEM

[75] Inventors: Yair Shimoni, Jerusalem; Bilha Nissenson, Hertzlia, both of Israel

[73] Assignee: Elscint Ltd., Haifa, Israel

[21] Appl. No.: 703,434

[22] Filed: Feb. 20, 1985

[51] Int. Cl.[4] ............................................. G06K 9/00
[52] U.S. Cl. ...................................... 364/900; 382/56; 364/514; 364/715.02
[58] Field of Search ............... 364/514, 900, 200, 724; 333/14; 382/54, 56

[56] References Cited

U.S. PATENT DOCUMENTS

| | | | |
|---|---|---|---|
| 4,087,788 | 5/1978 | Johannesson | 382/56 |
| 4,124,871 | 11/1978 | Morrin | 364/900 |
| 4,125,873 | 11/1978 | Chesarek | 364/900 |
| 4,224,678 | 9/1980 | Lynch et al. | 364/724 |
| 4,328,426 | 5/1982 | D'Ortenzio | 364/724 |
| 4,363,007 | 12/1982 | Haramoto et al. | 333/14 |
| 4,394,774 | 7/1983 | Widergren et al. | 382/56 |
| 4,503,510 | 3/1985 | Weaver | 364/724 |
| 4,532,651 | 7/1985 | Pennebaker, Jr. et al. | 382/54 |
| 4,536,846 | 8/1985 | Raychaudhuri et al. | 364/514 |
| 4,590,582 | 5/1986 | Umemura | 364/724 |
| 4,654,877 | 3/1987 | Shimoni et al. | 382/56 |
| 4,667,304 | 5/1987 | Hier et al. | 364/825 |
| 4,674,125 | 6/1987 | Carlson et al. | 382/49 |

Primary Examiner—Gareth D. Shaw
Assistant Examiner—Viet Q. Nguyen
Attorney, Agent, or Firm—Sandler & Greenblum

[57] ABSTRACT

A data compression-expansion (decrease-increase) method for improving the signal-to-noise ratio of compressed-expanded data while retaining the fidelity of the original data comprises the steps of using a filter that can be separated into a smoothing portion and an enhancing portion. The selected filter is separated into the two portions: a first portion for smoothing prior to decreasing the data, and a second portion for enhancing after increasing the data whereby the filter has the maximal effect of decreasing noise while having a minimal effect on the data.

8 Claims, 1 Drawing Sheet

DATA COMPRESSION SYSTEM

FIELD OF THE INVENTION

This invention is concerned with the processing of data and more specifically with data compression and expansion methods to facilitate the use and the storage of large amounts of data.

BACKGROUND OF THE INVENTION

Present day processing systems and methods have to deal with large amounts of data. To facilitate the handling of the large amounts of data, data compression is often used. The data may be compressed using some specific compression methods; such as for example using consecutive data difference methods (delta-modulation). The data is operated on and/or stored in the compressed mode. Subsequentially, the data is once again expanded for its actual use; forming an image, for example.

The compression ratio (CR) of the compressed data, that is the ratio of the quantity of non-compressed data to the quantity of compressed data, is a quantitative measurement of the efficiency of the data compression system.

The CR is limited by the variability of the data, among other things. Further constraints are imposed by the fidelity requirements of the system. For example, very high CRs can be achieved if only a little variability is accomodated; e.g., the whole data set can be replaced by its mean;—a single number. The CR would then be equal to the original number of data units (numbers), say 262,144 for a 512×512 matrix of image data. However, this method of compression incurs a huge loss of fidelity as the original data usually does have some variability containing important information which is lost in the compression method of the above example.

Many compression methods use "predictors" of some kind. Predictors use a small number of parameters and a small input of data points, to "predict" the rest of the data. Some predictors are "running" predictors whose input is the last few data points and whose output is the next data point. An example of a "predictor" method is the "difference" or "delta modulation" method, which "predicts" that each data point is followed by another data point with the same value. These "predictors" must be completed with "correctors", measuring and correcting the predictor error. Using a suitable predictor can greatly decrease the variability of the data, and thus enable much higher CRs. However, this improvement is limited by random inaccuracies, which are commonly called "noise". Being random they are unpredictable, putting a lower limit to the variability, and consequently a top limit to the possible CR with a given fidelity. According to the second law of thermodynamics, it is impossible to completely separate noise from meaningful (and predictable) variations. However, in the general case of the frequency content (power spectrum) of the data, the higher the frequency, the higher the relative noise content, until at some limit frequency the noise dominates. Therefore all data at frequencies higher than this limit can be viewed as pure noise. This limit is never higher than the Nyquist frequency, which is determined by the data sampling rate (it is the highest frequency that can be correctly sampled). Based on this property, sometimes low-pass filters (smoothings) are used to reduce the high frequency content in the data, thus improving the predictability and hence the CR in predictor methods.

However, reducing the noise by filtering often results in deleting actual data from the system, therby decreasing the fidelity of the system. A compromise therefore, has to be reached between noise filtering and the fidelity of the system.

The "compromise" is often set to the side of fidelity; therby, reducing the compression ratio; i.e., the efficiency of the compression. This is true for example in medical imaging where the fidelity of the final data can make the difference between a proper diagnosis of a patient's problems and an incorrect diagnosis. Therefore, the physicians and clinicians tend to arrange the systems to prevent deletion of actual signals. Thus, in the past, most smoothing filters that were used prior to compressing the data, if any, were limited by the desire to maintain the fidelity in order to reproduce all of the data when the smoothed and compressed data is expanded.

It must be noted that the natural variability of the data and the "signal to noise ratio" (SNR) vary with application, data acquisition system and specific data. Therefore, the compromise chosen is highly dependent on the above variables as well as personal preferences. The medical imaging systems usually have low SNR, thus making high fidelity compression methods inefficient.

The large amounts of data handled by present equipment such as a medical imaging equipment warrants the use of systems which will make the data compression much more efficient and effective without significantly reducing the fidelity.

One apparent way of balancing the opposing demands of high CR and high fidelity is to "undo" the effect of the smoothing after expanding the data. This is sometimes called "restoration". As before, the second law of thermodynamic prevents complete restoration. For example, the use of sharpening high pass filters (to undo the effects of smoothing) tends to increase the noise more than the data; and, in medical images, where the noise is relatively large to begin with, this is unacceptable and may even lead to numerical instability. The algebraic solution of N simultaneous equations (N being the number of pixels in the image) is both impossibly long and numerically instable. It is well known that the time required for solving a set of N simultaneous algebraic equations increases as N to the 4th power and in an image of 512×512 pixels we have 262,144 equations making the problem virtually insoluble using the presently available equipment. Thus, an apparent way of balancing the opposing goals of high CR and high fidelity appears to be blocked.

A definition is supplied here of a seperable filter to aid in understanding the description of the invention:

A separable filter is a filter that can be effected by operating its two parts consecutively. (The order does not matter for "linear" filters).

The separability of filter F is mathematically denoted as:

$$F = F1 * F2 = [F2 * F1]$$

The mathematical notation for operating the separable filter F on a data set X is:

$$F1 * (F2 * X) = (F1 * F2) * X = F * X = [(F2 * F1)] * X = F2 * (F1 * X)]$$

The part in square brackets denotes symmetry with respect to order (cummulativity).

BRIEF DESCRIPTION OF THE INVENTION

Accordingly, an object of the present invention is to provide data compression/expansion methods with improved compression ratios but nonetheless retaining a high degree of fidelity of the data, said methods comprising the steps of:

using a separable filter which will filter out noise and have a minimal effect on the data;

filtering the uncompressed data to smooth the uncompressed data with a first part of the chosen seperable filter, compressing the smooth data, handling the compressed data, expanding the compressed data after the handling, and filtering the expanded data, with the rest of the separable filter to restore data which may have been removed by the first part of the separable filter.

As a feature of the invention, the handling step includes storing the compressed data. The data is subsequently read out of the store prior to the expanding step.

A further feature of the system, especially effective when the data compression described herein is used in digital subtraction angiography (DSA) medical imaging equipment, includes using digital type filters at least before the compression or also after the expansion which are seperable into X and Y direction filters.

A synergistic effect obtained with such digital type filters is the inherent substantial eliminaton of point source data; thereby reducing by a large amount the noise from the final data in addition to accomplishing the compression and expansion of the data. This feature takes advantage of the fact that in DSA images, the data is usually unidimensional, while the noise is point-like.

Basically the invention features removing high frequency data (and noise) components from the data prior to compression and being "smart" enough to know what has actually been removed from the original data so that what has been removed may be restored after the expansion. This removal and subsequent restoration results in improved compression ratios without adversely effecting the fidelity of the final data.

Since by the laws of thermodynamics we cannot fully restore what has been removed a filter is selected that in the particular environment will have a minimal effect on the data. The filter (F) chosen is "separable". The chosen filter then is separated into a smoothing part (F1) and an enhancing part (F2). The filter (F) has a frequency response that is close to unity over the desired range and is only modestly different (less) at the high end of the frequency range. Then, using the smoothing part F1 to filter the uncompressed data and the enhancing part F2 to filter the expanded data yields a data set which resembles the original data set to a high degree of fidelity. This in effect replaces true restoration by a close approximation which is easily accomplished by convolution methods.

BRIEF DESCRIPTION OF THE DRAWINGS

The above mentioned and other features and objects of the present invention will be better understood from the following description of the invention made in conjunction with the accompanying drawings; wherein.

GENERAL DESCRIPTION

Figure 1:
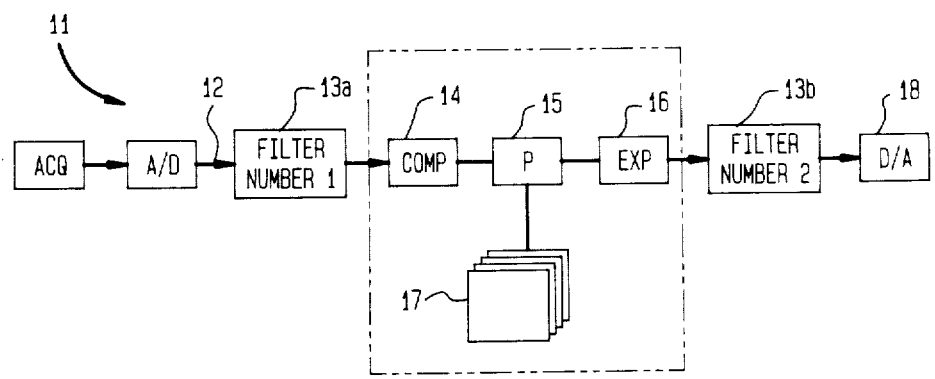
FIG. 1 shows an inventive separable filter arrangement for use in a data compression system.

The compression expansion system 11 of FIG. 1 has incoming data on line 12 going to first filter means, shown as filter 13a. The filter 13a is used prior to compression by data compression equipment 14. A second filter 13b is shown being used after expansion by expansion equipment 16. The compressed data is handled by processor unit 15. The handling may include writing the data and reading the data into and out from memory means shown generally as 17. While memory means are shown, data processing means that use compressed data can be substituted for the memory means 17. Data transmitting means for example, could also be substituted for the memory means.

The data from the processing means 15 is expanded by expander means 16, and again filtered by filter unit 13b. Essentially an object of the invention is to replace the signals comprised of data and noise that were removed from the system by filter 13a, during the process of filtering, with filter 13b. Subsequentially the data from filter 13b may be converted to analog form by digital to analog converter, however, this is not necessary, within the scope of the invention. A feature of the invention ideally lies in using a separable filter 13 so that data removed by the portion 13a of the separable filter is replaced by the portion 13b of the separable filter.

Figure 2:
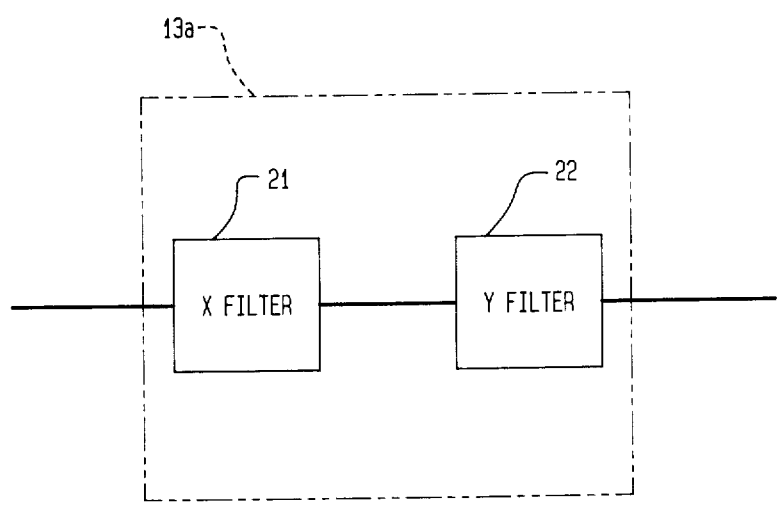
FIG. 2 shows another embodiment of at least the first or the first and the second filter of the separable filter arrangement shown in FIG. 1.

The system finds ideal usage with DSA medical imaging equipment where the major objects being imaged are vascular, such as arteries and veins. The data of interest therefore is of a particular type; that is the data describes unidimensional articles. The data does not describe points. While the invention can be applied in its basic form to all kinds of data, it is particularly effective in handling DSA data. Thus FIG. 1 can be thought of as being part of a DSA system with the data being filtered coming from amplifier means of the DSA system after the data has been converted by the image intensifier and video camera from x-rays to electrical signals. In a preferred embodiment of the inventive system each portion of the chosen separable filter is separated into two filters such as shown in FIG. 2 with filter 13 where one filter 21 acts in the X direction and the other filter 22 acts in the Y direction. Thus, the filter portion 13 is two dimensional. The advantage of this type of filter arrangement is that the noise that is merely point data is automatically removed or reduced compared to the vascular like data. Since the useful data for the DSA system is unidimensional, the point data is basically noise. Therefore, the compression ratio is improved by the filter arrangement and synergistically noise is reduced.

As is well known, separable filters can be comprised of two or more simple filters. Such filters can be selected where one of the filters is a smoothing filter such as a low pass filter while the other filter is a sharpening filter or an enhancing filter, that is a high pass filter. Such separable filters can be selected that are slightly low pass because they reduce the high frequencies around the Nyquist limits and slightly enhancing because they do enhance certain high frequency combinations.

In the following description of the filters the notation (a1,a2, ..., a2n+1) is used to denote an odd length filter which when operating on digital data (such as digital images) can be described as the convolution:

$$X(j + n) = \sum_{i=1}^{2n+1} aiX(j + i)/ \sum_i ai$$

where:
 Xi = is the unfiltered data,
 Xi = is the filtered data,
 n = a non-zero integer selected for hardware or software convenience, and
 i and j are position indicies.

A similar definition holds for even length filters, as is obvious to those skilled in the art.

Specific examples of the generalized filter follows:

EXAMPLE 1

A filter of the shape (a1,a2,a3,4a3−9a2+16a1, 6a3−16a2+30a1, 4a3−9a2+16 a1,a3,a2,a1)

can be separated into a first low pass filter:

(1,4,6,4,1), and into a second filter:

(a1, a2−4a1, a3−4a2+10a1, a2−4a1,a1)

which may be sharpening.

The sum of the elements a3−2a2+4a1 is positive, even while some of its elements are negative. To be enhancing at least one of the element must be negative. Thus:

(1,7,19,29,32,29,19,7,1)=(1,4,6,4,1)*(1,3,1,3,1)

is a non enhancing filter or a non-sharpening (smoothing only) filter, while:

(−1,−2, 8,34,50,34,8,−2, −1)=(1,4,6,4,1)*(−1,2,6,2,−1)

is an enhancing or sharpening filter.

EXAMPLE 2

A filter of the shape:

(a1,a2,a3,3a3−5a2+7a1,3a3−5a2+7a1,a3,a2,a1)

which can be separated into the low pass filter (1,3,3,1);

and the filter:

(a1, a2−3a1, a3−3a2+6a1, a2−3a1, a1)

which is enhancing under similar constraints.

EXAMPLE 3

A filter of the shape:

(a1,a2,4a2−9a1, 6a2−16a, 4a2−9a1, a2, a1)

which can be separated into a low pass filter:

(1,3,3,1)

and the filter:

(a1, a2−3a1, a2−3a1, a1).

EXAMPLE 4

A filter of the same size as example 3 but having the shape:

(a1,a2,a3,2a3−2a2+2a1, a3, a2, a1)

This can be separated into a low pass filter;

(1,2,1), and the filter:

(a1,a2−2a1, a3−2a2+3a1, a2−2a1, a1)

It should be noted that any filter of the type in Example 3 also fits Example 4 because if a3 is equal to 4a2−9a1 then automatically (2a3−2a2+2a1) is equal to (6a2−16a1). This is because the filter (1,3,3,1) can be further separated into the filters (1,2,1)*(1,1) and the filter operation is associative ((A*B)*C=A*(B*C)).

Within the scope of the invention it is possible to use a separable filter which fits the needs of specific problems. The selected filter is then separated to perform the smoothing function before the compression in order to obtain a high compression ratio while operating the sharpening filter after expanding the data.

For example, in DSA operations one might like to compress low dose images of the heart which are acquired at high resolution. These images may be represented as 512×512 matrices with each matrix element representing a pixel of the size 0.3×0.3 mm or smaller.

These images contain no useful information at all at wave lengths of 0.6 mm or less because of the Nyquist limit (2 pixels). There is very little useful information at the wave length of 0.9 mm (3 pixels) due to three factors which are:

(1) system modulation transfer function (MTF);
(2) high noise (low dose); and
(3) motion blurring (heart beat for example).

Therefore, filters which leave all wave lengths higher than 1 mm relatively intact, reduce the 0.9 mm data and remove the 0.6 mm data are satisfactory.

Many types of such filters exist, two examples are:

(one dimensional) $At = (-1, 2t, -1) * (1,4,5,4,1)$
$Bt = (1, -t, +2t, -t, 1) * (1,4,6,4,1)$ where t is a selectable parameter.

The Fourier Transforms of these filters yield their frequency responses:

$At = (t - \cos(\pi t w)^* \cos^4(\pi t w/2)/(t-1)$ $Bt = [(t-1) - t \cos(\pi t w) + 2 \cos^2(\pi t w)]^* \cos^4(\pi t w/2)$ In these equations Bt has the following values:

TABLE I

| WAVE LENGTH | w | ~Bt | (1, 4, 6, 4, 1) | (1, −t +2 t, −t, 1) |
|---|---|---|---|---|
| 2 PIXELS | 1 | 0 | 0 | N.A. |
| 3 PIXELS | ⅔ | (3 t −1)/32 | 1/16 | (3 t −1)/2 |

TABLE I-continued

| WAVE LENGTH | w | ~Bt | (1, 4, 6, 4, 1) | (1, −t +2 t, −t, 1) |
|---|---|---|---|---|
| 4 PIXELS | ½ | (t −1)/4 | ½ | (t −1) |
| 6 PIXELS | ½ | 9(t −1)/32 | 9/16 | (t −1)/2 |
| ∞ PIXELS | 0 | 1 | 1 | 1 |

The filter with t=4.5 described in the following Table II, for example, has proven very satisfactory in DSA systems. This filter reduces noise and especially high frequency noise.

TABLE II

| WAVE LENGTH | W | ~Bt t = 4.5 | (2, −9, +18, −9, 2) |
|---|---|---|---|
| 2 PIXELS | 1 | 0 | N.A. |
| 3 PIXELS | ½ | 25/64 | 6.25 |
| 4 PIXELS | ½ | ½ | 3.5 |
| 6 PIXELS | ½ | 63/64 | 1.75 |
| ∞ PIXELS | 0 | 1 | 1 |

This filter has practically no effect on the resolution.

For two dimensional images the first smoothing filter should also be two dimensional, but the sharpening filter may be one dimensional. Thus, the following filter may be used:

$$Ct = (1, -t, 2t, -t, 1)* \begin{pmatrix} 1,4,6,4,1 \\ 1,4,6,4,1 \end{pmatrix} =$$

$$(1, -t, 2t, -1)*(1,4,6,4,1)* \begin{pmatrix} 1 \\ 1 \end{pmatrix}$$

The filter has almost no visible effect on the image while the compression ratios are greatly improved by using the two dimensional filter Ct. This solution fits the specific needs of Digital Fluroscopy where the image is created (and stored) by a scanning mechanism, which scans along lines in one dimension (such as X) with the lines in the image being along the other dimension (such as Y). This asymmetry of treatment allows asymmetry in the filtering.

The filters described above completely destroy all information with a wavelength of 2 pixels. This causes some useful information to be lost, without the possibility of restoration. To avoid this drawback filters must be chosen whose frequency response does not vanish at the 2 pixel wavelength. Two examples are:

$$D=(-1,5,-1)*(7,18,7)$$

$$E=(1,-10,38,-10,1)*(2,7,14,7,2)$$

The restoring part, which is a high-pass or enhancing filter, has the usual property of a sharpening filter—it increases noise. This is offset by a synergistic effect of this type of filters, operating digitally in 2 dimensions. Digital Fluoroscopy deals mainly in blood vessels which are essentially unidimensional. Thus, if the same filter is applied in both the X and the Y direction, then the amplitude of point-like data, which is noise in the DF image, is reduced by the square of the reducing factor of blood vessels one pixel wide. This allows the smoothing part of the filter to cause point-like data to vanish while leaving the blood vessels. The unidimensional filter is set by choosing as the reducing factor Gn (the inverse of the frequency response for the wavelength in pixels). The n is equal to the 2 in a preferred embodiment indicating a 2 pixel wavelength. Another criterion is that Gn be smaller than twice the expected amplitude of blood vessels while larger than the square root of twice the expected amplitude R of the noise where n=2, so that:

$$2V > G2 > \sqrt{2R}.$$

Then if one filter and data are digital the amplitude of most noise will be reduced to under ½ and be rounded to zero; while most unidimensional data will be reduced to a value larger than ½ and therefore, be rounded to a non-zero value, and be restorable. One can use this value to create a new smoothing filter. For example, $$G2*(1,4,6,4,1)+(-1,2,-1)$$

When G2=2 we obtain the smoothing filter E above.

Thus, the ensuing reduction in noise offsets the noise addition of the sharpening filter.

The choice of filters is application dependent, but the guidelines are:
  the filter is separable
  the filter is digital
  the amplitude of the noise level is less than $Gn^{1/2}$ when Gn is the 2-pixel frequency response of the filter
  the amplitude of the blood vessels should be more than Gn/2. while the method is explained using specific methodical embodiments it should be understood that these embodiments are described by way of example only and not as a limitation on the scope of the invention.

What is claimed is:

1. A data compression-expansion method for use in digital subtraction angiographic systems for improving the signal to noise ratio of the expanded data while maintaining the fidelity of the data; said method comprising the steps of:
  acquiring data,
  digitizing the acquired data to provide uncompressed digital data,
  using a transfer function separable digital filter which filters out noise and has a minimal effect on the digital data, said separable filter comprising a filter that has frequency response of approximately 1 over the applicable frequency range with a slight fall off at the high end of the range, said separable filter having a first portion and a second portion,
  filtering the uncompressed digital data to smooth the uncompressed digital data with said first portion of the separable filter,
  compressing the smooth digital data by coding to reduce the quantity of the smooth digital data while maintaining the amplitude of the retained data,
  operating on the compressed smooth digital data,
  expanding the compressed smooth digital data after said operating step to restore the quantity of the smooth digital data present prior to the compressing step, and
  inherently restoring most of the digital data removed by the first portion of the separable filter by filtering the expanded digital data with said second portion of the separable filter to enhance the expanded digital data.

2. The data compression-expansion method of claim 1 wherein the step of operating on includes storing said smoothed, compressed data.

3. The data compression-expansion method of claim 1 wherein the step of operating on includes transmitting said smoothed, compressed data.

4. The data compression-expansion method of claim 1 wherein the step of operating on includes processing said smoothed, compressed data.

5. The data compression-expansion method of claim 1 wherein the data is two dimensional and wherein the step of filtering the uncompressed digital data comprises filtering in two dimensions.

6. The data compression-expansion method of claim 5 wherein the step of filtering the expanded data comprises filtering in two dimensions.

7. The data compression-expansion method of claim 1 wherein each portion of the separable filter includes a one-dimensional filter operating along the X axis and a one-dimensional filter operating along the Y axis.

8. The compression-expansion method of claim 1 wherein the first portion of the separable filter has a wavelength reducing factor of Gn, where n=2 and Gn is smaller than twice the expected amplitude of blood vessels while larger than the square root of twice the expected amplitude of the noise in the system whereby the ensuing reduction in noise offsets the noise addition of a subsequently used sharpening filter.

* * * * *